UNITED STATES PATENT OFFICE.

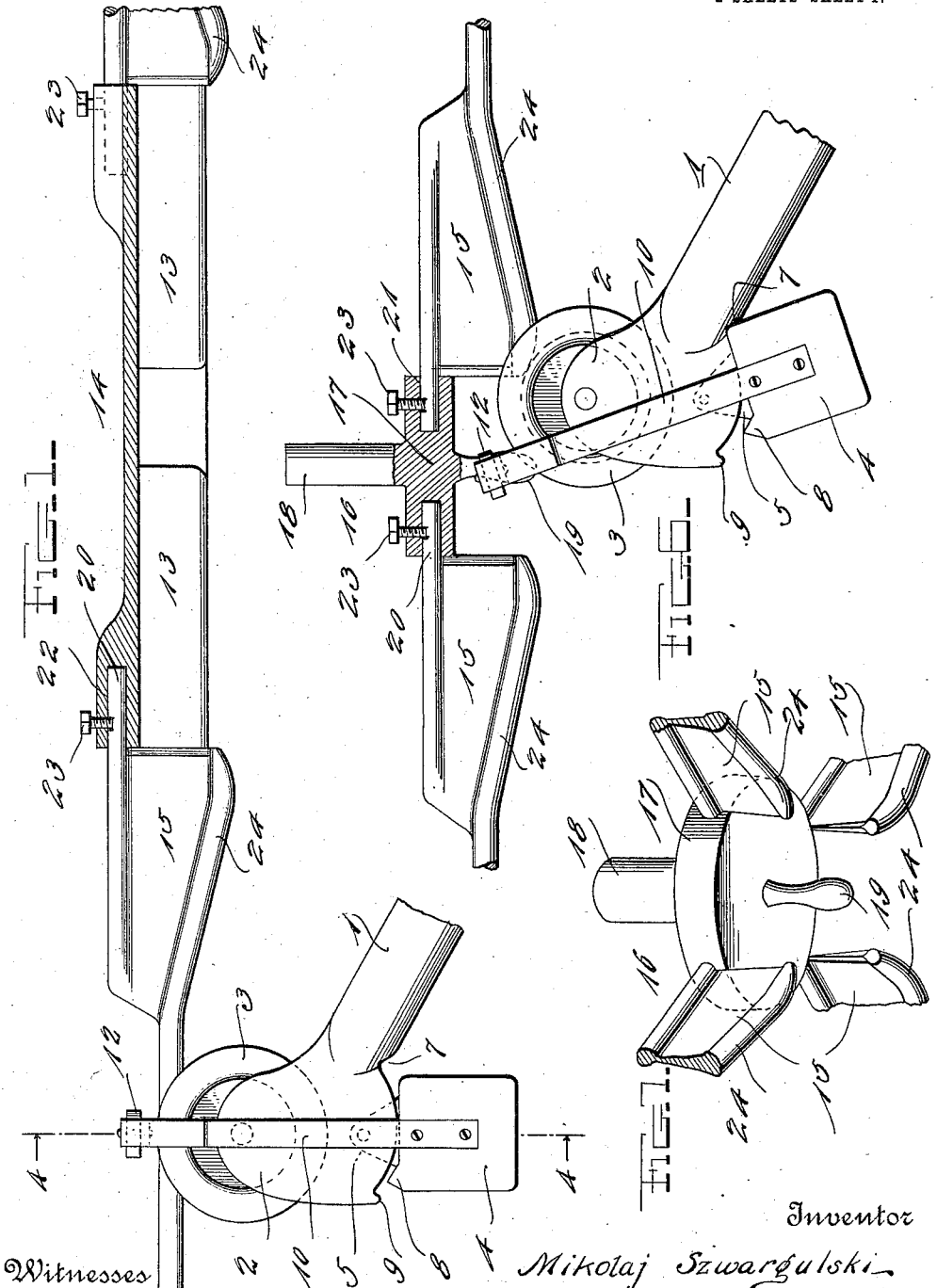

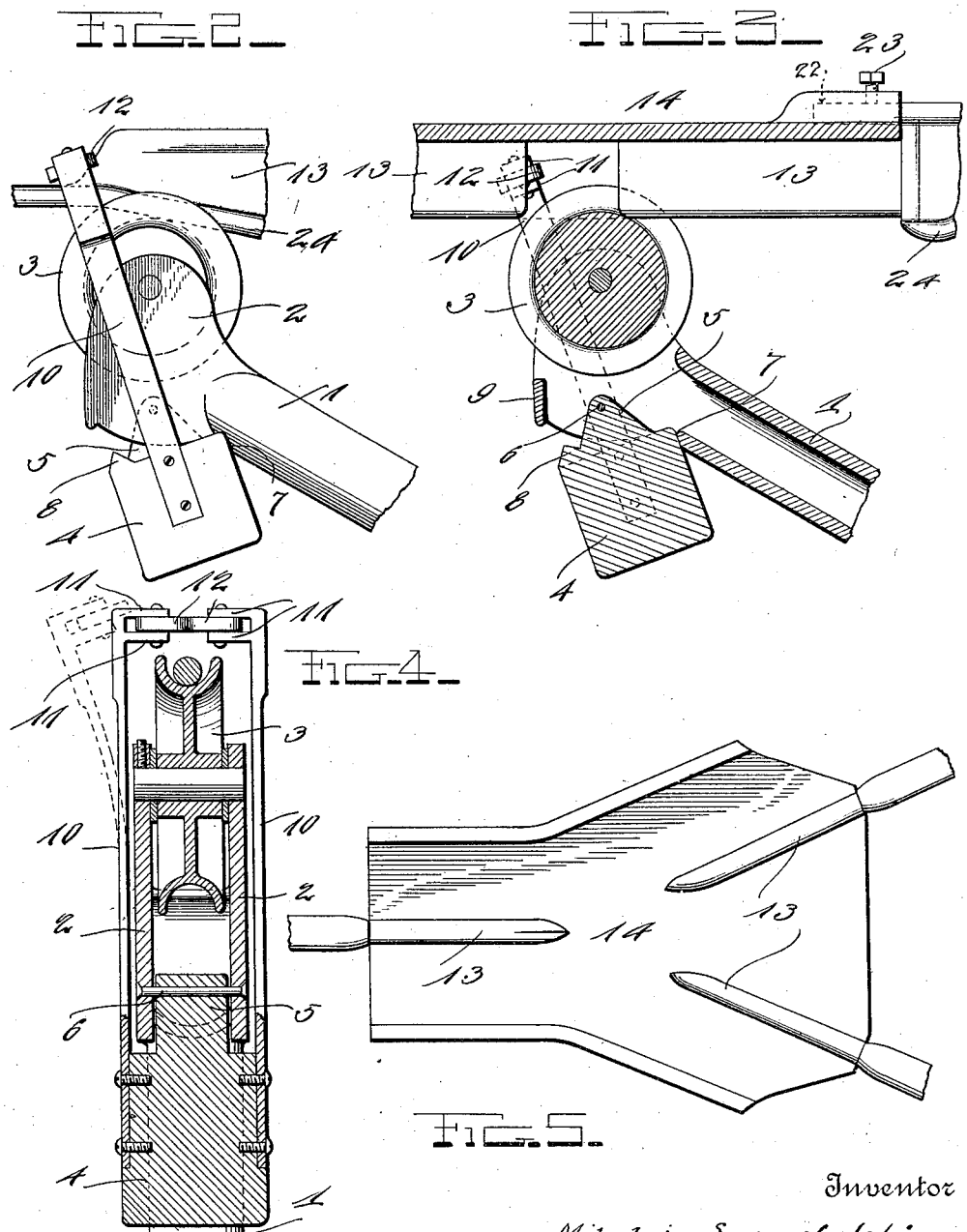

MIKOLAJ SZWARGULSKI, OF ST. LOUIS, MISSOURI.

TROLLEY-GUARD.

1,073,303.  Specification of Letters Patent.  Patented Sept. 16, 1913.

Application filed January 27, 1913. Serial No. 744,571.

*To all whom it may concern:*

Be it known that I, MIKOLAJ SZWARGULSKI, a citizen of the United States, residing at St. Louis, State of Missouri, have invented certain new and useful Improvements in Trolley-Guards; and I do declare the following to be a full, clear, and exact description of the invention, such as will enable others skilled in the art to which it appertains to make and use the same.

This invention relates to improvements in trolley guards.

One object of the invention is to provide a trolley guard having an improved means for positively preventing the casual disengagement of the trolley wheel from the trolley wire when passing around curves or at the crossing or switching points of the wires.

Another object of the invention is to provide a trolley guard, which, when the trolley is passing over wire crossing members or switch members, will form a contact device which will prevent the circuit being broken when the trolley wheel jumps or passes from one part of the crossing or switch member to another part.

With these and other objects in view the invention consists of certain novel features of construction, and the combination and arrangement of parts as will be more fully described and claimed.

In the accompanying drawings; Figure 1 is a side view of the upper end of a trolley pole and the trolley wheel with my improved guard applied thereto and showing the position of the guard as the trolley wheel is about to pass onto a switch; Fig. 2 is a similar view showing the position of the guard immediately after the wheel has engaged the switch; Fig. 3 is a central vertical sectional view of the trolley pole and wheel and a portion of the switch showing the manner in which the guard acts to prevent the breaking of the circuit when the trolley wheel passes from one part of the switch to another. Fig. 4 is a vertical cross sectional view on an enlarged scale taken on line 4—4 of Fig. 1; Fig. 5 is a plan view of the switch shown in Figs. 1, 2 and 3 of the drawings; Fig. 6 is a side view of the upper end of the trolley pole and the trolley wheel showing the same engaged with a wire crossing member and illustrating the manner in which the guard acts to prevent the breaking of the circuit when the trolley wheel passes from one part of said crossing member to another part; Fig. 7 is a perspective view of a portion of the crossing member shown in Fig. 6.

Referring more particularly to the drawings, 1 denotes a trolley pole which may be of any suitable construction and is here shown as of tubular form and provided on its end with parallel bearing lugs 2 between which is revolubly mounted the trolley wheel 3.

My improved guard comprises a weight 4 which is preferably of rectangular form and has on its upper end a reduced tongue 5 which fits loosely between the lower portion of the bearing plates 2 and the upper end of the trolley pole and is pivotally engaged with a weight supporting pin 6 arranged through the plates 2 and secured therein in any suitable manner. The upper portion of the lower side of the pole 1 has formed therein a stop notch 7 with which the adjacent upper corner of the weight 4 is adapted to be engaged when the trolley guard is in the position for forming a contact as shown in Fig. 3 of the drawings, said engagement of the weight with the notch limiting the movement of the guard in this direction. On the opposite upper corner of the weight is formed a stop lug 8 which is adapted to engage a cross bar 9 arranged between the plates 2 whereby the movement of the guard in the opposite direction is limited.

Secured to the sides of the weight 4 are upwardly projecting spring arms 10, the upper ends of which terminate at a point a suitable distance above the trolley wheel and on said upper ends of the arms are formed inwardly projecting parallel bearing lugs 11 between which are revolubly mounted contact rollers 12. The rollers 12 are normally held in engagement with each other to close the space between the arms or lugs 11 thereon by the spring arms 10, said arms being sufficiently flexible to permit the rollers 12 to separate when brought into engagement with the blades or deflecting plates 13 of a switch 14 as shown in Figs. 2, 3 and 5 of the drawings or with the wire attaching plates 15 of the crossing member 16 as shown in Figs. 6 and 7 of the drawings. The inner ends of the deflecting blades 13 of the switch member and the wire attaching plates 15 of the crossing member have their inner ends beveled or wedge shaped to more readily separate the rollers 12 when brought into engagement therewith.

My improved guard in addition to forming an efficient means for preventing the trolley wheel from disengaging or leaving the trolley wire as clearly shown in Fig. 4 of the drawings also forms a reliable contact device for preventing the breaking of the circuit when the trolley wheel passes from one part of a switch or crossing member to another. In Figs. 2 and 3 of the drawings is shown the manner in which the guard acts to prevent the breaking of the circuit as the trolley wheel passes from one part of the switch to another. By reference to Fig. 2 it will be seen that as soon as the rollers of the spring contact arms 10 come into engagement with the outer end of one of the blades or plates 13 of the switch that the guard will be swung on its shaft or pivotal support 6 to an inclined position wherein the rollers are disposed some distance in rear of the contacting surface of the trolley wheel. The guard will be held in this inclined position by the frictional engagement of the rollers with the blades of the switch as long as the rollers engage the blades so that after the trolley wheel leaves the inner end of one blade and until said wheel comes into engagement with another blade of the switch the rollers 12 will remain in contact or engagement with the blade which the trolley wheel or the left so that either the trolley wheel or the rollers of the guard are continuously in contact with some part of the switch. It will thus be seen that the electric circuit passing from the switch to the trolley wheel will not be broken when the wheel leaves one part of the switch to engage another part thereof. In the same manner the circuit is prevented from being broken when the trolley wheel passes under a crossing member and in order to facilitate this operation of the guard, I preferably provide a crossing member comprising a circular head or blade supporting plate 17 on which is arranged an upwardly extending shank 18 which may be attached to suitable bracing and supporting wires in any suitable manner. In the center of the lower side of the head 17 and projecting downwardly therefrom is a depending contact post 19 with which the trolley wheel and the rollers 12 of the guard are engaged when passing from the inner end of one of the contact plates or blades 15 to another as is clearly illustrated in Fig. 6 of the drawing. The contact blades or plates 15 of both the crossing member and the switch have formed on their inner ends longitudinally extending attaching fingers 20 which are engaged with sockets 21 in the head 17 of the crossing member or sockets 22 in the ends of the plate 14 of the switch, said fingers being firmly secured in said sockets by set screws 23 as shown.

When the trolley wheel is in engagement with the straight stretches of the trolley wire the guard is held in position to prevent the disengagement of the trolley wheel from the wire by the weight 4 which acts as a pendulum and swings the trolley guard to a vertical position as shown in Figs. 1 and 4 of the drawings, in which position the rollers 12 are held in engagement by the spring action of the arms 10 and thus prevent the casual disengagement of the trolley wheel from the trolley wire and also from the plates or blades 13 of the switch or the blades 15 of the crossing member, said blades or plates being provided on their lower edges with enlarged ribs or beads 24 which serve to prevent the rollers from slipping out of engagement with the plates when the end of the trolley wheel and pole are pulled downwardly from any cause.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is;

In a trolley guard, a trolley pole having on its upper end bearing plates, a cross bar connecting the lower portion of said plates, a trolley wheel revolubly mounted in the upper portion thereof, a guard operating weight pivotally mounted between the lower portion of said plates and adapted to swing between the end of the trolley pole and the cross bar connecting the plates, a bar engaging lug formed on said weight, spring contact arms secured to the sides of the weight and projecting upwardly above the trolley wheel, pairs of inwardly extending bearing lugs on the upper ends of said arms, contact rollers revolubly mounted between said lugs said rollers being held in operative engagement by the spring action of said arms whereby the trolley wheel is prevented from being casually disengaged from the trolley wire and whereby when said rollers are brought into engagement with the parts of a trolley wire switch or crossing member, said guard will be swung to an inclined position wherein the contact rollers will engage the parts of the switch or crossing member in rear of the point thereon engaged by the trolley wheel, thus preventing the breaking of the electric circuit when the trolley wheel passes from one part of the switch or crossing member to another part thereof.

In testimony whereof I have hereunto set my hand in presence of subscribing witness.

MIKOLAJ $\overset{\text{his}}{\times}$ SZWARGULSKI.
mark

Witnesses:
 BOLESLAW LEWANDOSKI,
 ADAM J. PUZNIAK,
 J. E. WHITE.

---

Copies of this patent may be obtained for five cents each, by addressing the "Commissioner of Patents, Washington, D. C."